United States Patent
Wakefield et al.

(10) Patent No.: US 9,910,173 B2
(45) Date of Patent: Mar. 6, 2018

(54) SATURATION END-POINT ADJUSTMENT

(71) Applicant: SCHLUMBERGER TECHNOLOGY CORPORATION, Sugar Land, TX (US)

(72) Inventors: Mark Wakefield, Abingdon (GB); Radek Pecher, Witney (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 604 days.

(21) Appl. No.: 14/535,004

(22) Filed: Nov. 6, 2014

(65) Prior Publication Data

US 2015/0142407 A1   May 21, 2015

Related U.S. Application Data

(60) Provisional application No. 61/904,566, filed on Nov. 15, 2013.

(51) Int. Cl.
*G06G 7/48* (2006.01)
*G01V 1/28* (2006.01)
*E02D 1/02* (2006.01)
*E21B 43/00* (2006.01)
*G01V 99/00* (2009.01)

(52) U.S. Cl.
CPC ............... *G01V 1/28* (2013.01); *E02D 1/027* (2013.01); *E21B 43/00* (2013.01); *G01V 99/00* (2013.01); *G01V 2210/663* (2013.01)

(58) Field of Classification Search
CPC .. G06F 17/5018; G06F 17/12; G06F 17/5009; G06F 17/501; G06F 15/5009; E21B 49/00; E21B 43/16; E21B 41/00; G01V 99/005
See application file for complete search history.

(56) References Cited

U.S. PATENT DOCUMENTS

| | | | |
|---|---|---|---|
| 8,131,526 B2 * | 3/2012 | Neville | E21B 49/00 703/10 |
| 2006/0265203 A1 * | 11/2006 | Jenny | G06F 17/5018 703/9 |
| 2010/0309749 A1 * | 12/2010 | Yogeswaren | G01V 1/28 367/38 |

(Continued)

OTHER PUBLICATIONS

Frontline Systems, Inc., Optimization Problem Types—Linear and Quadratic Programming, http://www.solver.com/linear-quadratic-programming, 2014 (3 pages).

(Continued)

*Primary Examiner* — Kandasamy Thangavelu
(74) *Attorney, Agent, or Firm* — Colin L. Wier; Gary Gex; Alex McGinn

(57) ABSTRACT

A method can include receiving fluid saturation data for fluid saturation parameters associated with permeabilities of a multidimensional spatial model of a geologic environment; adjusting at least a portion of the fluid saturation data to provide adjusted fluid saturation data by optimizing a quadratic function subject to linear constraints; and simulating flow of fluid using the adjusted fluid saturation data for fluid saturation parameters associated with permeabilities and the multidimensional spatial model of the geologic environment.

20 Claims, 11 Drawing Sheets

(56) References Cited

U.S. PATENT DOCUMENTS

| | | | |
|---|---|---|---|
| 2012/0150506 A1* | 6/2012 | Han | G06F 17/12 703/2 |
| 2012/0232859 A1* | 9/2012 | Pomerantz | G01V 99/005 703/2 |
| 2012/0310614 A1* | 12/2012 | Beattie | E21B 43/16 703/10 |
| 2013/0226540 A1* | 8/2013 | Pita | G06F 17/5009 703/2 |
| 2013/0246032 A1* | 9/2013 | El-Bakry | E21B 41/00 703/10 |

OTHER PUBLICATIONS

Schlumberger, How Eclipse Works, Eclipse 100 User Course, Sep. 14, 1999 (7 pages).

* cited by examiner $$\underline{512} \quad H_g = \frac{S_g}{S_g + S_w - S_{wco}}$$

$$\underline{514} \quad H_w = \frac{S_w - S_{wco}}{S_g + S_w - S_{wco}}$$

$$\underline{516} \quad k_{ro} = k_{rog} H_g + k_{row} H_w$$

End Point Scaling Plugin v2  GUI 810

Case: E300
☑ Use Filter
Region index property: SATNUM

Mobility tolerance: 0.01

| | | |
|---|---|---|
| SWL | $S_w^R$ SWL ▼ | ☑ Fix SWL |
| SWCR | $S_w$ SWCR ▼ | ☑ Fix SWCR |
| SWU | $S_w$ SWU ▼ | ☑ Fix SWU |
| SGL | $S_g^R$ SGL ▼ | ☑ Fix SGL |
| SGCR | $S_g$ SGCR ▼ | ☑ Fix SGCR |
| SGU | $S_g$ SGU ▼ | ☑ Fix SGU |
| SOWCR | $S_o$ SOWCR ▼ | ☑ Fix SOWCR |
| SOGCR | $S_o$ SOGCR ▼ | ☑ Fix SGCR |

✓ Check
✓ Adjust
✓

Fig. 8

SATURATION END-POINT ADJUSTMENT

RELATED APPLICATIONS

This application claims priority to and the benefit of U.S. Provisional Patent Application No. 61/904,566, filed 15 Nov. 2013, which is incorporated by reference herein.

BACKGROUND

A reservoir may be a subsurface body of rock that includes sufficient porosity and permeability to store and transmit fluids. As an example, sedimentary rock may possess more porosity than various types of igneous and metamorphic rocks. Sedimentary rock may form under temperature conditions at which hydrocarbons may be preserved. A reservoir may be a component of a so-called petroleum system. A geologic environment may be a sedimentary basin that may include one or more fluid reservoirs.

SUMMARY

A method can include receiving fluid saturation data for fluid saturation parameters associated with permeabilities of a multidimensional spatial model of a geologic environment; adjusting at least a portion of the fluid saturation data to provide adjusted fluid saturation data by optimizing a quadratic function subject to linear constraints; and simulating flow of fluid using the adjusted fluid saturation data for fluid saturation parameters associated with permeabilities and the multidimensional spatial model of the geologic environment. A system can include a processor; memory operatively coupled to the processor; and at least one module that includes processor-executable instructions stored in the memory to instruct the system where the instructions include instructions to receive fluid saturation data for fluid saturation parameters associated with permeabilities of a multidimensional spatial model of a geologic environment; adjust at least a portion of the fluid saturation data to provide adjusted fluid saturation data via optimization of a quadratic function subject to linear constraints; and simulate flow of fluid using the adjusted fluid saturation data for fluid saturation parameters associated with permeabilities and the multidimensional spatial model of the geologic environment. A computer-readable storage medium can include computer-executable instructions to instruct a computer where the instructions include instructions to: receive fluid saturation data for fluid saturation parameters associated with permeabilities of a multidimensional spatial model of a geologic environment; adjust at least a portion of the fluid saturation data to provide adjusted fluid saturation data via optimization of a quadratic function subject to linear constraints; and simulate flow of fluid using the adjusted fluid saturation data for fluid saturation parameters associated with permeabilities and the multidimensional spatial model of the geologic environment. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 8 illustrates an example of a graphical user interface;

DETAILED DESCRIPTION

Figure 1:
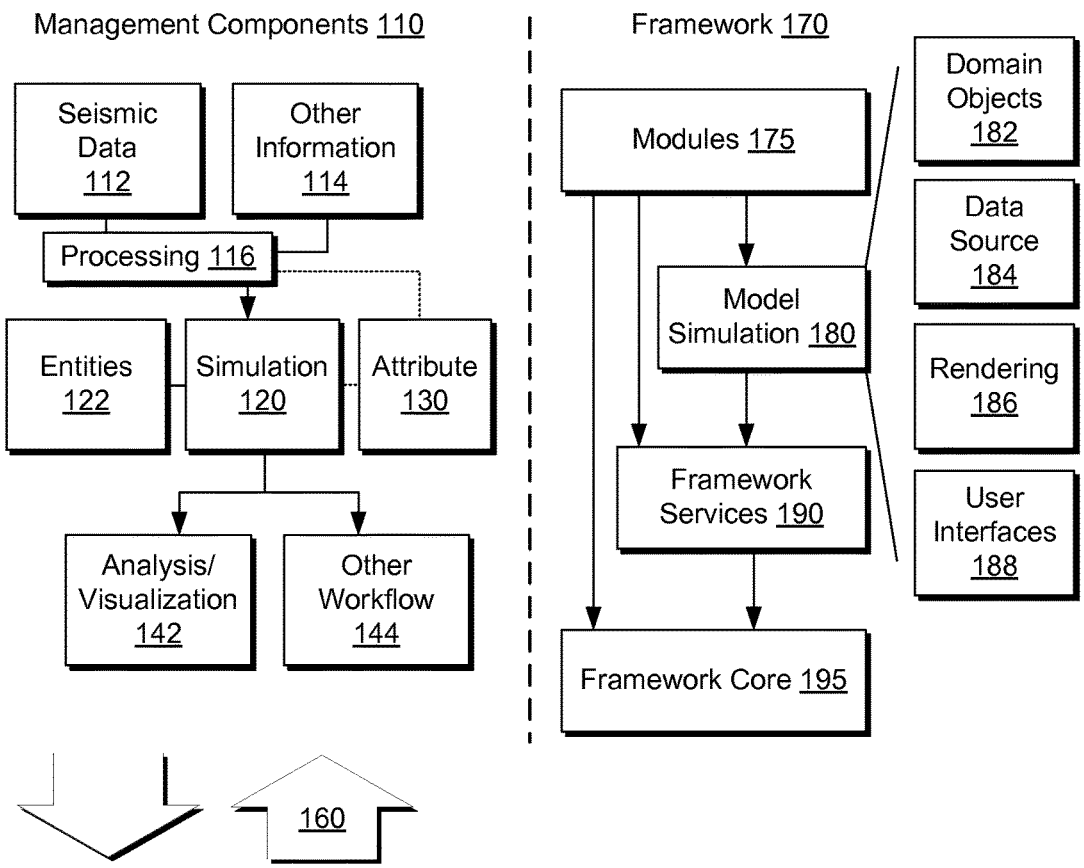
FIG. 1 illustrates an example system that includes various components for modeling a geologic environment and various equipment associated with the geologic environment.
Figure 1:
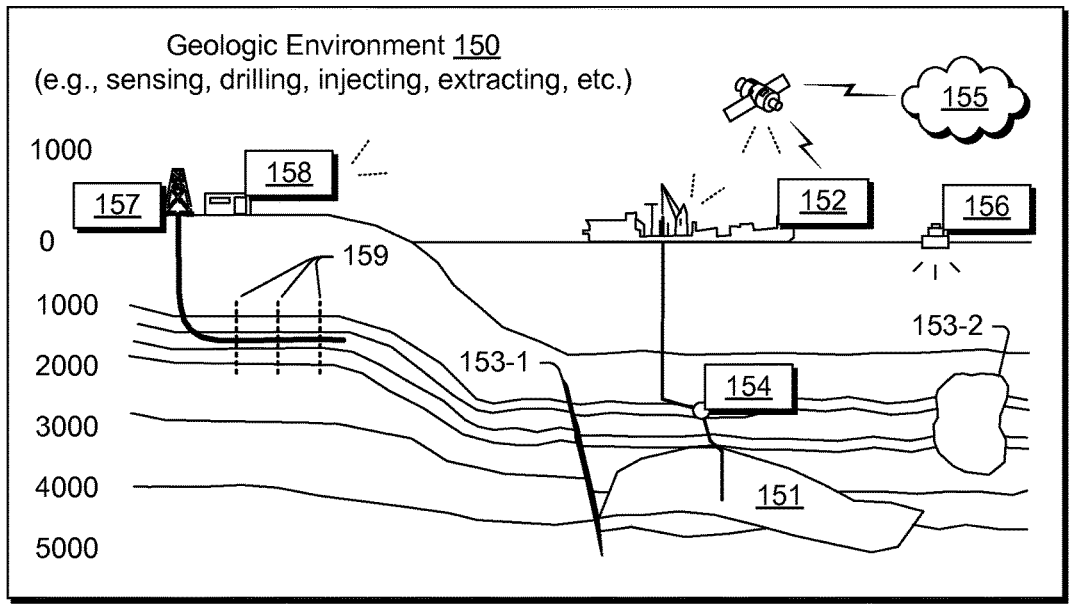

This description is not to be taken in a limiting sense, but rather is made merely for the purpose of describing the general principles of the implementations. The scope of the described implementations should be ascertained with reference to the issued claims.

A reservoir may be a subsurface body of rock that includes sufficient porosity and permeability to store and transmit fluids. A simulator may simulate physical phenomena that may occur in a reservoir, which may be a reservoir in a sedimentary basin (e.g., a geologic environment). In reservoir simulation, multiphase flow effects through a porous medium (e.g. or porous media) may be determined via tabulated saturation functions that may, for example, characterize relative permeability of one phase given saturation of one or more other phases. As an example, tabulated functions may be prepared for various facies within a reservoir. In such an example, where a reservoir simulation uses a grid cell model, various cells within the grid cell model may be assigned common values (e.g., via tabulated functions, tabulated function values, etc.).

As an example, data in a tabulated form (e.g., discrete data points, etc.) may represent a function of phase relative permeability versus phase saturation (e.g., or a "curve" of phase relative permeability versus phase saturation). Of such function data, so-called end-points may be defined. For example, consider the following end-points: (i) connate saturation, the saturation below which a phase does not fall; (ii) critical saturation, the highest saturation for which a relative permeability of a phase is zero (e.g., at a saturation value above the critical saturation value, a phase may be deemed to be mobile); and (iii) maximum saturation, the saturation above which a phase does not exceed. As an example, saturation functions may be specified to honor certain conditions between phases, which may arise, for example, due to mass conservation (e.g., mass balance), as phase saturations of multiple fluids that may be constrained to sum to unity (e.g., approximately unity within an error limit or error limits).

As an example, a subsurface environment may be understood via data acquisition and analysis. As an example, seismology may be used to acquire data. In such an example, the data may be subject to interpretation. For example, consider seismic interpretation as a process that involves examining seismic data (e.g., with respect to location and time or depth) to identify one or more types of subsurface structures (e.g., facies, horizons, faults, geobodies, etc.). Seismic data may optionally be interpreted with other data such as, for example, well log data. As an example, a process may include receiving data and generating a model based at least in part on such data.

As an example, a process may include determining one or more seismic attributes. A seismic attribute may be considered, for example, a way to describe, quantify, etc., characteristic content of seismic data. As an example, a quantified characteristic may be computed, measured, etc., from seismic data. As an example, a framework may include modules (e.g., processor-executable instructions stored in memory) to determine one or more seismic attributes. Seismic attributes may optionally be classified, for example, as volume attributes or surface attributes or one-dimensional attributes.

A seismic interpretation may be performed using displayable information, for example, by rendering information to a display device, a projection device, a printing device, etc. As an example, one or more color schemes (e.g., optionally including black and white or greyscale) may be referenced for displayable information to enhance visual examination of the displayable information. Where the human eye will be used or is used for viewing displayable information, a display scheme may be selected to enhance interpretation.

As an example, seismic interpretation may be performed using seismic to simulation software such as the PETREL® seismic to simulation software framework (Schlumberger Limited, Houston, Tex.), which includes various features to perform attribute analyses (e.g., with respect to a 3D seismic cube, a 2D seismic line, etc.). While the PETREL® seismic to simulation software framework is mentioned, other types of software, frameworks, etc., may be employed. As an example, a model built using a framework may be utilized by a simulator, for example, consider a reservoir simulator such as the ECLIPSE® simulator (Schlumberger Limited, Houston, Tex.), the INTERSECT® simulator (Schlumberger Limited, Houston, Tex.), etc.

As an example, "pay" may be a reservoir or portion of a reservoir that includes economically producible hydrocarbons (e.g., pay sand, pay zone, etc.). The overall interval in which pay sections occur may be referred to as gross pay; where, for example, smaller portions of the gross pay that meet local criteria for pay (e.g., such as minimum porosity, permeability and hydrocarbon saturation) are referred to as net pay. As an example, a reservoir simulator may assess a geologic environment that includes at least a portion of a reservoir (e.g., or reservoirs) as to its physical properties that may be used to estimate pay. In such an example, parameters as to physical properties such as porosity, permeability and saturation may be included within equations that can model a geologic environment. As an example, such properties may be initialized prior to performing a simulation. In such an example, values for the properties may affect simulation results, convergence of a simulation solution, etc. As an example, a method can include adjusting values prior to performing a simulation, which may, in turn, reduce computation time, enhance convergence rate, allow for output of a converged solution, etc.

FIG. 1 shows an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE® reservoir simulator, the INTERSECT® reservoir simulator, etc. As an example, a simulation component, a simulator, etc. may optionally include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework. The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh. As an example, a mesh may be a grid. Such constructs (e.g., meshes or grids) may be defined by nodes, cells, intervals, segments, etc. As mentioned, a so-called meshless approach may be implemented, for example, based on points such as in a point cloud, etc.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
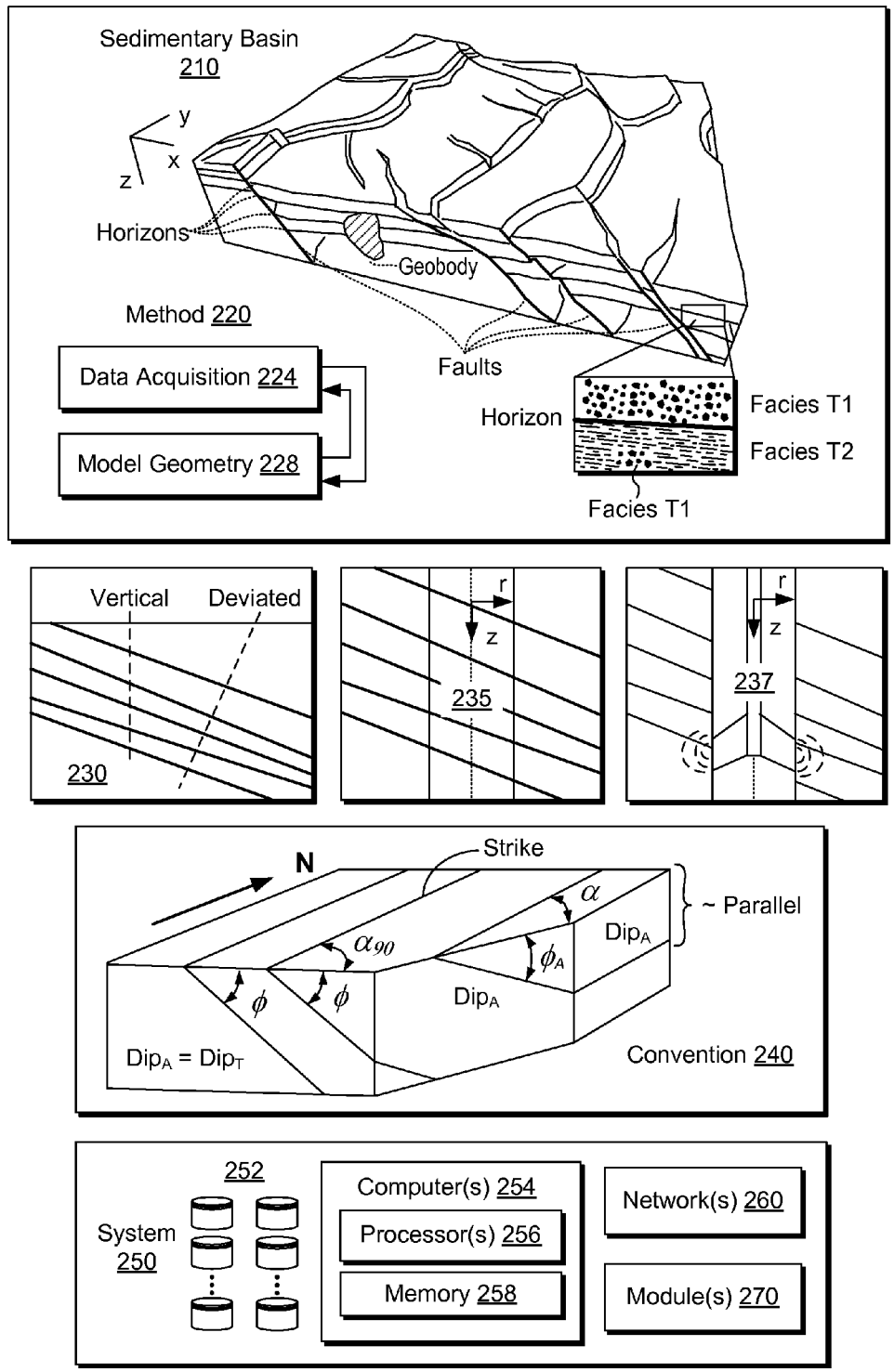
FIG. 2 illustrates an example of a sedimentary basin, an example of a method, an example of a formation, an example of a borehole, an example of a borehole tool, an example of a convention and an example of a system.

FIG. 2 shows an example of a sedimentary basin 210 (e.g., a geologic environment), an example of a method 220 for model building (e.g., for a simulator, etc.), an example of a formation 230, an example of a borehole 235 in a formation, an example of a convention 240 and an example of a system 250.

As an example, reservoir simulation, petroleum systems modeling, etc. may be applied to characterize various types of subsurface environments, including environments such as those of FIG. 1.

In FIG. 2, the sedimentary basin 210, which is a geologic environment, includes horizons, faults, one or more geobodies and facies formed over some period of geologic time. These features are distributed in two or three dimensions in space, for example, with respect to a Cartesian coordinate system (e.g., x, y and z) or other coordinate system (e.g., cylindrical, spherical, etc.). As shown, the model building method 220 includes a data acquisition block 224 and a model geometry block 228. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop and well log data. Furthermore, data may include depth and thickness maps stemming from facies variations (e.g., due to seismic unconformities) assumed to following geological events ("iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.).

In basin and petroleum systems modeling, quantities such as temperature, pressure and porosity distributions within the sediments may be modeled, for example, by solving partial differential equations (PDEs) using one or more numerical techniques. Modeling may also model geometry with respect to time, for example, to account for changes stemming from geological events (e.g., deposition of material, erosion of material, shifting of material, etc.).

A commercially available modeling framework marketed as the PETROMOD® framework (Schlumberger Limited, Houston, Tex.) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows.

As shown in FIG. 2, the formation 230 includes a horizontal surface and various subsurface layers. As an example, a borehole may be vertical. As another example, a borehole may be deviated. In the example of FIG. 2, the borehole 235 may be considered a vertical borehole, for example, where the z-axis extends downwardly normal to the horizontal surface of the formation 230. As an example, a tool 237 may be positioned in a borehole, for example, to acquire information. As mentioned, a borehole tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

As an example, a borehole may be vertical, deviate and/or horizontal. As an example, a tool may be positioned to acquire information in a horizontal portion of a borehole. Analysis of such information may reveal vugs, dissolution planes (e.g., dissolution along bedding planes), stress-related features, dip events, etc. As an example, a tool may acquire information that may help to characterize a fractured reservoir, optionally where fractures may be natural and/or artificial (e.g., hydraulic fractures). Such information may assist with completions, stimulation treatment, etc. As an example, information acquired by a tool may be analyzed using a framework such as the TECHLOG® framework (Schlumberger Limited, Houston, Tex.).

As to the convention 240 for dip, as shown, the three dimensional orientation of a plane can be defined by its dip and strike. Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 240 of FIG. 2, various angles $\phi$ indicate angle of slope downwards, for example, from an imaginary horizontal plane (e.g., flat upper surface); whereas, dip refers to the direction towards which a dipping plane slopes (e.g., which may be given with respect to degrees, compass directions, etc.). Another feature shown in the convention of FIG. 2 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $\text{Dip}_T$ in the convention 240 of FIG. 2). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $\text{Dip}_A$ in the convention 240 of FIG. 2). Apparent dip may be the dip of a plane as measured in any other direction except in the direction of true dip (see, e.g., $\phi_A$ as $\text{Dip}_A$ for angle $\alpha$); however, it is possible that the apparent dip is equal to the true dip (see, e.g., $\phi$ as $\text{Dip}_A = \text{Dip}_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 240 of FIG. 2, the dip of a plane as seen in a cross-section perpendicular to the strike is true dip (see, e.g., the surface with $\phi$ as $\text{Dip}_A = \text{Dip}_T$ for angle $\alpha_{90}$ with respect to the strike). As indicated, dip observed in a cross-section in any other direction is apparent dip (see, e.g., surfaces labeled $\text{Dip}_A$). Further, as shown in the convention 240 of FIG. 2, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., $\text{Dip}_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 240 may be used with respect to an analysis, an interpretation, an attribute, etc. (see, e.g., various blocks of the system 100 of FIG. 1). As an example, various types of features may be described, in part, by dip (e.g., sedimentary bedding, faults and fractures, cuestas, igneous dikes and sills, metamorphic foliation, etc.). As an example, dip may change spatially as a layer approaches a geobody. For example, consider a salt body that may rise due to various forces (e.g., buoyancy, etc.). In such an example, dip may trend upward as a salt body moves upward.

Seismic interpretation may aim to identify and/or classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As an example, equations may be provided for petroleum expulsion and migration, which may be modeled and simulated, for example, with respect to a period of time. Petroleum migration from a source material (e.g., primary migration or expulsion) may include use of a saturation model where migration-saturation values control expulsion. Determinations as to secondary migration of petroleum (e.g., oil or gas), may include using hydrodynamic potential of fluid and accounting for driving forces that promote fluid flow. Such forces can include buoyancy gradient, pore pressure gradient, and capillary pressure gradient.

As shown in FIG. 2, the system 250 includes one or more information storage devices 252, one or more computers 254, one or more networks 260 and one or more modules 270. As to the one or more computers 254, each computer may include one or more processors (e.g., or processing cores) 256 and memory 258 for storing instructions (e.g., modules), for example, executable by at least one of the one or more processors. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252.

As an example, the one or more modules 270 may include instructions (e.g., stored in memory) executable by one or more processors to instruct the system 250 to perform various actions. As an example, the system 250 may be configured such that the one or more modules 270 provide for establishing the framework 170 of FIG. 1 or a portion thereof. As an example, one or more methods, techniques, etc. may be performed using one or more modules, which may be, for example, one or more of the one or more modules 270 of FIG. 2.

As an example, "pay" may be a reservoir or portion of a reservoir that includes economically producible hydrocarbons (e.g., pay sand, pay zone, etc.). The overall interval in which pay sections occur may be referred to as the gross pay; where, for example, smaller portions of the gross pay that meet local criteria for pay (e.g., such as minimum porosity, permeability and hydrocarbon saturation) are net pay. Thus, a workflow may include assessing a geologic environment that includes at least a portion of a reservoir (e.g., or reservoirs) as to its physical properties that may be used to estimate pay. For example, an assessment may include acquiring data, estimating values, etc. and running a simulation using a reservoir simulator. In such an example, parameters as to physical properties such as porosity, permeability and saturation may be included within equations that can model a geologic environment.

As an example, porosity may be defined as the percentage of pore volume or void space, or that volume within rock that can include fluid(s). Porosity may be a relic of deposition (e.g., primary porosity, such as space between grains that were not compacted together completely) or it may develop through alteration of the rock (e.g., secondary porosity, such as when feldspar grains or fossils are dissolved from sandstones). Porosity may be generated by development of fractures (e.g., consider fracture porosity). Effective porosity may be defined as the interconnected pore volume in rock that can contribute to fluid flow in a reservoir (e.g., excluding isolated pores). Total porosity may be defined as the total void space in rock whether or not it can contribute to fluid flow (e.g., consider effective porosity being less than total porosity). As an example, a shale gas reservoir may tend to have relatively high porosity, however, alignment of platy grains such as clays can make for low permeability.

As an example, permeability may be defined as an ability, or measurement of rock ability, to transmit fluids, which may be measured in units such as darcies, millidarcies, etc. Formations that transmit fluids readily (e.g., sandstones) may be characterized as being "permeable" and may tend to include connected pores; whereas, "impermeable" formations (e.g., shales and siltstones) may tend to be finer grained or of a mixed grain size, with smaller, fewer, or less interconnected pores.

Absolute permeability is the measurement of the permeability conducted when a single fluid, or phase, is present in a matrix (e.g., in rock). Effective permeability is the ability to preferentially flow or transmit a particular fluid through a rock when other immiscible fluids are present in the reservoir (e.g., effective permeability of gas in a gas-water reservoir). The relative saturations of fluids as well as the nature of a reservoir can affect effective permeability. As an example, saturation may be defined for a water, oil and gas as the relative amount of the water, the oil and the gas in pores of rock, for example, as a percentage of volume.

Relative permeability may be defined as the ratio of effective permeability of a particular fluid at a particular saturation to absolute permeability of that fluid at total saturation. As an example, if a single fluid is present in rock, its relative permeability may be 1 (unity). Calculation of relative permeability can allow for comparison of different abilities of fluids to flow in the presence of each other, for example, as the presence of more than one fluid may tend to inhibit flow.

Figure 3:
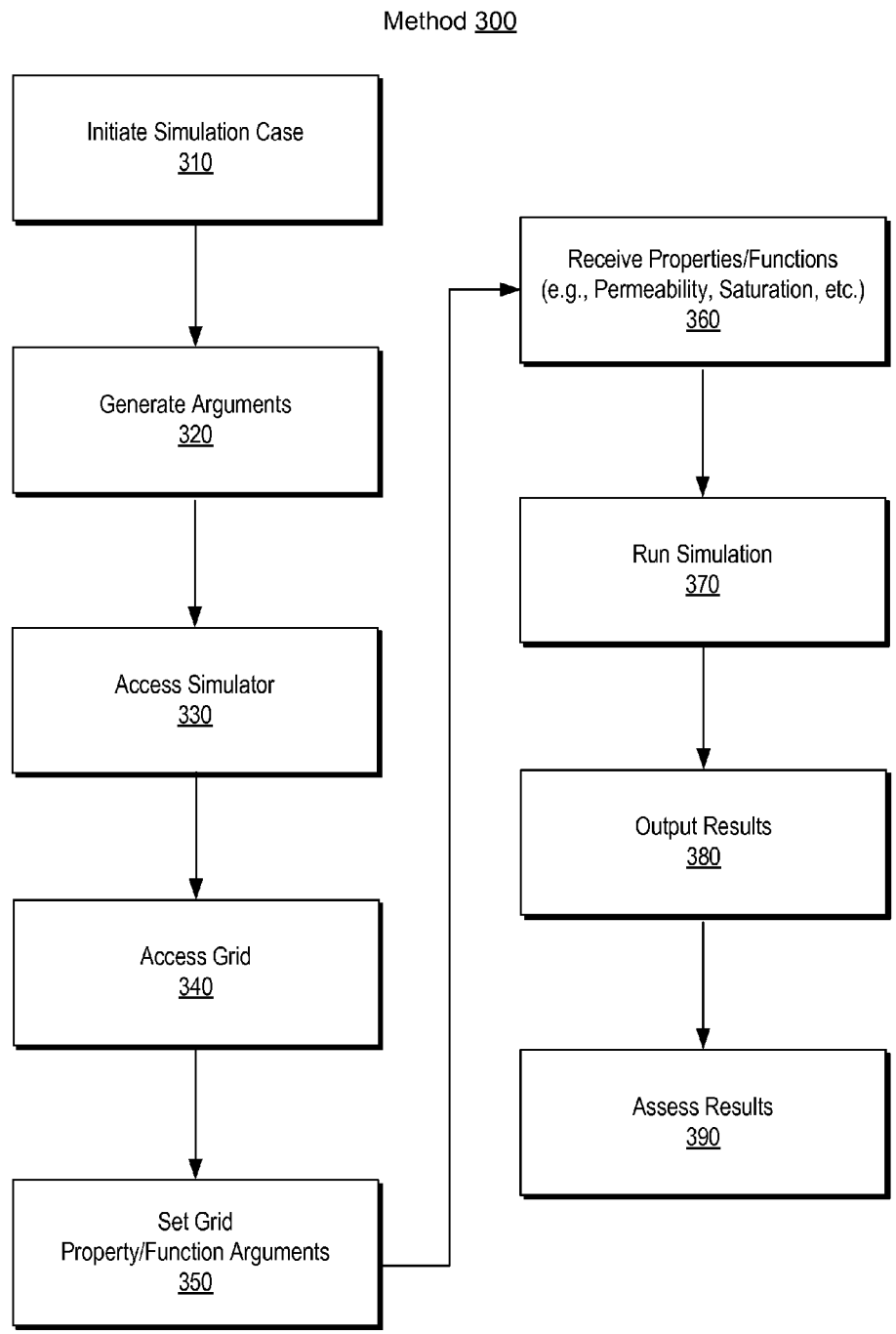
FIG. 3 illustrates an example of a method.

FIG. 3 shows an example of a method 300 that includes an initiation block 310 for initiating a simulation case, a generation block 320 for generating arguments, an access block 330 for accessing a simulator, an access block 340 for accessing a grid, a set block 350 for setting grid property and function arguments, a reception block 360 for receiving properties and/or functions (e.g., permeability, porosity, saturation, etc.), a run block 370 for running a simulation, an output block 380 for outputting simulation results and an assessment block 390 for assessing simulation results.

As an example, a method may include creating a simulation case, for example, using a framework (e.g., the OCEAN® framework). In such an example, a workflow may include initiating a simulation case, optionally using a tool such as a "wizard". As an example, a workflow can include defining arguments. For example, consider arguments that may be associated with a grid model of a geologic environment. In such an example, a grid model may be a pillar grid model or other type of grid model. Arguments associated with a grid model may include physical properties of rock such as, for example, porosity and permeability and may include functions that can define physical phenomena such as, for example, a saturation function, a rock compaction function, a black oil fluid function, etc.

As an example, a workflow may include accessing a reservoir simulator such as, for example, an ECLIPSE® reservoir simulator, an INTERSECT® reservoir simulator, etc. As an example, a workflow can include getting a grid from a grid porosity property and, for example, setting a case grid property argument (e.g., .Grid.Matrix.Porosity) to an input porosity property (e.g., as a "GridItem<Property>"). As an example, a workflow can include setting grid property arguments (e.g., "Grid.Matrix.Permeability" for indexes I, J and K of a grid) to appropriate input permeability properties (e.g., as a "GridItem<Property>"). As an example, a workflow can include setting one or more case function arguments. For example, consider a saturation function being set to an input function, a rock compaction function being set to an input function, a black oil function being set to an input function, etc.

As an example, a workflow may include a case argument for a simulation case such as an initialization argument (e.g., consider "InitializeByEquilibration").

As an example, a workflow can include receiving properties and functions. For example, consider accessing data for a project created with a framework such as the PETREL® framework. In such an example, data may be received for purposes of performing a simulation such as a reservoir simulation. For example, consider a Gullfaks project (e.g., for at least a portion of the Gullfaks field, an oil and gas field in the Norwegian sector of the North Sea) where properties such as permeability and porosity may be loaded, a sand saturation function (e.g., as a type of rock physics function) may be loaded, a consolidated sandstone rock compaction function may be loaded (e.g., as a type of rock physics function), where "light oil and gas" may be loaded as a black oil fluid input, etc. Given various properties and functions, a simulation may be run that may provide simulation results.

As an example, a grid may include grid cells where properties are defined with respect to a position or positions of a grid cell. For example, a property may be defined as being at a centroid of a grid cell. As an example, consider cell properties such as porosity (e.g., a PORO parameter), permeability in an x-direction (e.g., a PERMX parameter), permeability in a y-direction (e.g., a PERMY parameter), permeability in a z-direction (e.g., a PERMZ parameter) and net-to-gross ratio (e.g., NTG) being defined as averages for a cell at a center of a cell. In such an example, the directions x, y and z may correspond to directions of indexes (e.g., I, J and K) of a grid that may model a geologic environment.

As an example, a reservoir simulator may take as input values that may be predetermined. For example, to approximate multiphase flow effects through porous media, one or more tabulated saturation functions values may be used that characterize relative permeability of a phase given one or more saturations of one or more other phases. As an example, tabulated functions may be available on a facies dependent basis where values are available for individual facies. As an example, where a cell of a model (e.g., a grid cell) is associated with a particular facies, that cell may be assigned a value from a table (e.g., or other form for a predetermined value). In such an example, multiple cells may be assigned a common value. For a corresponding geologic environment, common values assigned to cells that model a region of the geologic environment may be an approximation of the geologic environment. In other words, values that differ for one or more of the cells may more accurately represent the region of the geologic environment.

As an example, tabulated data may represent a function of a phase relative permeability versus phase saturation. As an example, a function may be a curve, optionally with one or more linear portions. As an example, a function (e.g., a curve, etc.) or functions can include points referred to as end-points. For example, consider the following examples of end-points: (i) connate saturation, the saturation below which the phase can never fall; (ii) critical saturation, the highest saturation for which the relative permeability of the phase is zero (e.g., at saturation above the critical saturation the phase is mobile); and (iii) maximum saturation, the saturation above which the phase does not exceed.

As an example, saturation functions may be specified to honor certain conditions between the phases which may arise as phase saturations may be constrained to a summation value. For example, a summation may be to a value of unity. As an example, constraints may specify that end-points lie in an interval from null to unity (e.g., from zero to one; [0,1]) and, for example, satisfy the following:

SWL≤SWCR<SWU
SGL≤SGCR≤SGU
SGU≤1−SWL
SGL≤1−SWU where SWL, SWCR and SWU are the water connate, critical and maximum saturations, respectively, and where SGL, SGCR and SGU are the corresponding gas connate, critical and maximum saturations, respectively.

As an example, to ensure that a mobile phase is present, the following constraints may be specified:

SWU−SWCR≥tolerance
SGU−SGCR≥tolerance
1−SWL−SGL−SOWCR≥tolerance
1−SWL=SGL−SOGCR≥tolerance SOWCR+SWCR+SGL+tolerance≤1
SOGCR+SGCR+SWL+tolerance≤1
where SOWCR is the critical oil-in-water saturation, and SOGCR is the critical oil-in-gas saturation. In the foregoing equations, "tolerance" can be a value specified (e.g., by a user, etc.) that can depend on a minimum mobile interval desired.

As an example, if a hysteresis relative permeability model is being used, two sets of functions (e.g., curves, etc.) may exist, for example, for a drainage process and for an imbibition process. In such an example, inequalities may apply to the two sets, for example, along with one or more additional constraints that may hold between the two sets.

As an example, analogous end-points and constraints can exist for 2-phase and n-phase systems, for directional relative permeabilities and for hysteretic relative permeabilities.

As an example, while tabular data has been described, a method may include taking tabulated data and applying a transformation in which the end-points are assigned new values and in which a saturation function is linearly mapped to fit these new values. Such an approach may be referred to as horizontal end-point scaling. Horizontal end-point scaling may be applied to match a simulation, for example, to production data or an estimated initial distribution of fluids. Horizontal end-point scaling may be applied on a per-cell basis and so whilst original tabular data might have satisfied one or more constraints, the transformed "curves" on individual cells in a simulation grid may not.

As an example, an approach such as vertical end-point scaling may be implemented, optionally in addition to horizontal end-point scaling. As to vertical end-point scaling, it may be performed where vertical permeability is scaled rather than saturations. In such an example, certain consistency constraints may hold in the case of vertical end-point scaling, particularly for hysteresis which specifies that imbibition and drainage curves are to be coincident (e.g., at certain points).

As an example, a method may implement a quadratic approach that may be applicable, for example, for vertical, or mixed vertical and horizontal end-point scaling. As an example, a method can provide for adjusting end-point data, for example, in an optimal manner that can help to ensure that constraints are met (e.g., optionally within one or more specified error criteria).

As an example, a method can include performing quadratic optimization with linear constraints to find a modified set of end-points that satisfy the constraints and also minimize the amount of adjustment performed. For example, if such adjustment is not performed then inconsistent data may cause convergence issues in a reservoir simulator, misleading results, or simply trigger data checking errors preventing the simulator to run. As an example, an adjustment technique may be applied to pre-process data, for example, within a modeling framework package (e.g., consider the PETREL® framework), within a reservoir simulator (e.g., consider the ECLIPSE® simulator, the INTERSECT® simulator, etc.), etc. As an example, in a simulator such a process may be applied during one or more data processing stages.

Figure 4:
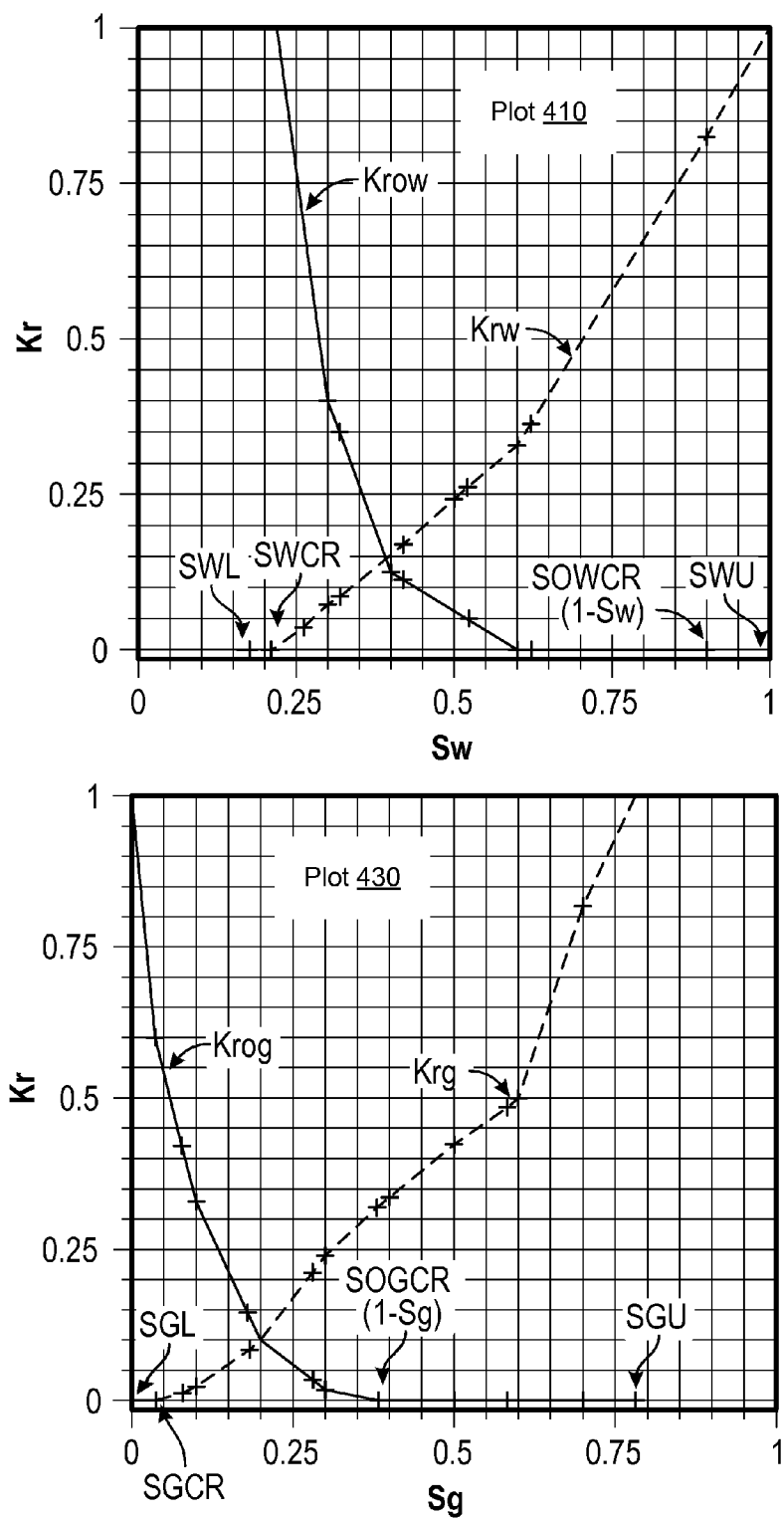
FIG. 4 illustrates example plots of permeability and saturation and end-point values.

FIG. 4 shows example plots 410 and 430 that include examples of end-points. In the plot 410, the abscissa corresponds to water saturation (Sw) while in the plot 430, the abscissa corresponds to gas saturation (Sg). In the plot 410, the ordinate corresponds to relative permeability (Kr) and in the plot 430 the ordinate corresponds to relative permeability (Kr). In the plot 410, data are shown for relative permeability for oil in water (Krow) and for water (Krw) while in the plot 430, data are shown for relative permeability for oil in gas (Krog) and for gas (Kg). In the example plot 410, end-points for SWL (water connate saturation), SWCR (critical water saturation), SOWCR (critical oil-in-water saturation) and SWU (maximum water saturation) are shown while in the plot 430, end-points for SGL (gas connate saturation), SGCR (critical gas saturation), SOGCR (critical oil-in-gas saturation) and SGU (maximum gas saturation).

In the example plots 410 and 430 of FIG. 4, relative permeability may be considered to be a function of saturation where relatively permeability values are "bound" at least in part by an end-point saturation value. In such an example, the end-point saturation value may be a type of boundary condition that can at least in part dictate a characteristic of a relative permeability "function". For example, an end-point saturation value may pin an end of a relatively permeability function. As an example, a relative permeability function may be referred to as a curve; though noting that one or more portions of such a curve may be linear (e.g., via approximation, etc.).

As an example, a method can include adjusting particular points of a property, that may be generally represented as Kr(S) and defined as the relative permeability as dependent on phase saturation (e.g., a function of phase saturation) where a series of such properties can exist. For example, consider a plurality of Kr(S) functions or curves as shown in the plots 410 and 430 (see, e.g., Krow, Krw, Krog, and Kg). In such a method, these points may be end-points that include corresponding values (end-point saturation values) that can determine, at least in part, shape and/or scale of individual Kr(S) properties (e.g., functions, curves, etc.). As a saturation parameter, itself, can be a solution variable, a simulation may compute values for a plurality of saturation parameters (e.g., solution variables) where such values lie within a respective range as bound by one or more end-point saturation values.

As an example, a saturation end-point value (e.g., or end-point saturation) can represent a saturation of a phase with respect to one or more phenomena. For example, consider a saturation end-point value for residual oil saturation, a saturation end-point value for irreducible water saturation, a saturation end-point value for trapped-oil saturation, and/or a saturation end-point value for trapped gas saturation, where each of such saturation end-point values can refer to a respective remaining saturation value of such individual phases after extensive displacement by one or more other phases. As to other saturation end-point values, consider, for example, a saturation end-point value for critical gas saturation and/or a saturation end-point value for condensate saturation, where such saturation end-point values can refer to a minimum saturation value at which a phase becomes mobile.

An end-point saturation value of a phase can depend on one or more factors, for example, consider one or more of structure of porous media, wettabilities, previous saturation histories, extent of displacement (e.g., a number of pore volumes injected), etc.

As an example, a method can include adjusting one or more saturation end-point values of relative permeabilities, for example, via adjusting values subject to constraints. As an example, method can include setting saturation scaling end-point values for individual cells of a grid cell model of a reservoir and, for example, running a simulation using the values where the simulation can compute saturation values for at least a portion of the cells of the grid cell model (e.g., subject to their respective end-point values).

Figure 5:
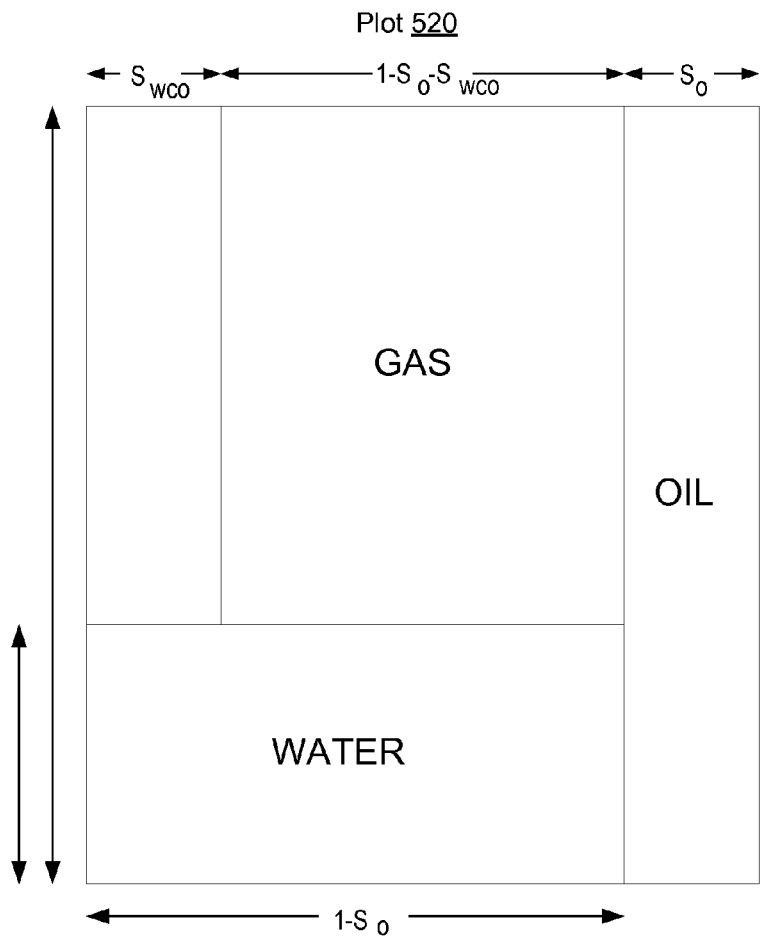
FIG. 5 illustrates examples of equations and an example of a plot.

FIG. 5 shows an example of a model for fraction of mobile gas 512 and a model for fraction of mobile water 514, an example of a three-phase oil relative permeability mixing rule 516 and a plot 520 that illustrates portions of water, gas and oil phases with respect to saturations. As illustrated in FIG. 5, oil relative permeability depends on saturations.

As an example, in the context of a geologic environment that includes a reservoir to be developed or under development, a reservoir simulator may be used to assess the environment, optionally before drilling of one or more wells or other operations (e.g., fracturing, etc.). In such an example, a reservoir simulator may be implemented to advance in time (e.g., via time increments, etc.) given one or more wells where, for example, an individual well may be assigned to be a sink or a source. As an example, a well may be an injection well or a production well. Information such as that of the plot 520 of FIG. 5 may facilitate development, for example, to understand better where mobile oil may exist within a reservoir, to understand better where injection or other recovery techniques may be implemented to produce oil, etc.

Figure 6:
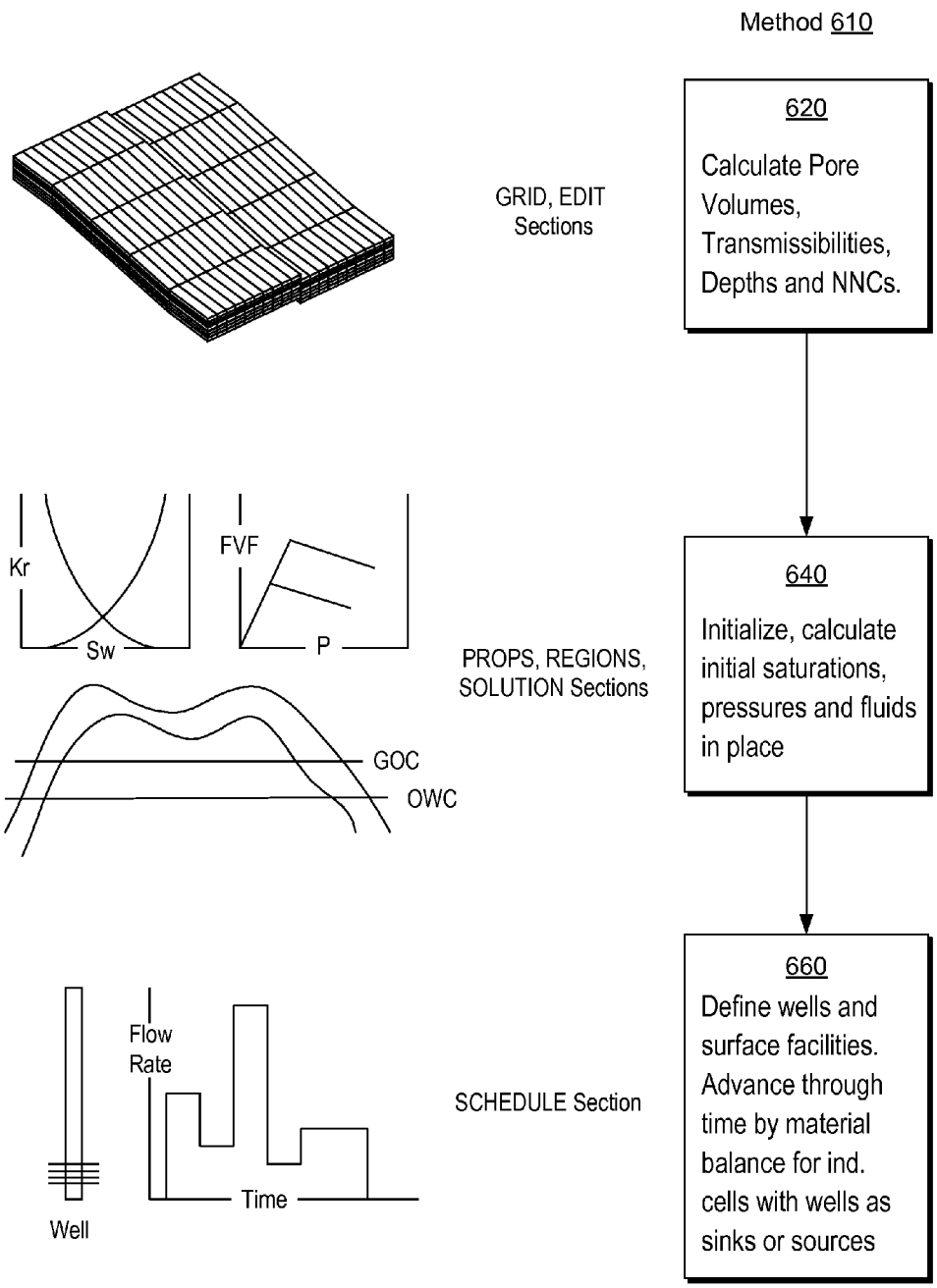
FIG. 6 illustrates an example of a method.

FIG. 6 shows an example of a method 610 that includes a calculation block 620 for calculating pore volumes, transmissibilities, depths and NNCs, an initialization and calculation block 640 for initializing and calculating initial saturations, pressure and fluids in place, and a definition and time progression block 660 for defining one or more wells and surface facilities and advancing through time, for example, via material balances for individual cells (e.g., with the one or more wells as individual sinks and/or sources).

As to the initialization and calculation block 640, for an initial time (e.g., $t_0$), saturation distribution within a grid model of a geologic environment and pressure distribution within the grid model of the geologic environment may be set to represent an equilibrium state (e.g., a static state or "no-flow" state), for example, with respect to gravity. As an example, to approximate the equilibrium state, calculations can be performed. As an example, such calculations may be performed by one or more modules. For example, one or more of a seismic-to-simulation framework, a reservoir simulator, a specialized module, etc. may be implemented to perform one or more calculations that may aim to approximate or to facilitate approximation of an equilibrium state. As an example, a reservoir simulator may include a module for initialization using data to compute capillary and fluid gradients, and hence fluid saturation densities in individual cells of a grid model that represents a geologic environment.

Initialization aims to define fluid saturations in individual cells such that a "system" being modeled is in an equilibrium state (e.g., where no external forces are applied, no fluid flow should take place in a reservoir, a condition that may not be obeyed in practice). As an example, consider oil-water contact and assume no transition zone, for example, where water saturation is unity below an oil-water contact and at connate water saturation above the contact. In such an example, grid cells that include oil-water contact may pose some challenges. A cell (e.g., or grid cell) may represent a point or points in space for purposes of simulating a geologic environment. Where an individual cell represents a volume and where that individual cell includes, for example, a center point for definition of properties, within the volume of that individual cell, the properties may be constant (e.g., without variation within the volume). In such an example, that individual cell includes one value per property, for example, one value for water saturation. As an example, an initialization process can include selecting a value for individual properties of individual cells.

As an example, saturation distribution may be generated based on one or more types of information. For example, saturation distribution may be generated from seismic information and saturation versus depth measurements in one or more boreholes (e.g., test wells, wells, etc.). As an example, reproduction of such an initial saturation field via a simulation model may be inaccurate and such an initial saturation field may not represent an equilibrium state, for example, as a simulator model approximates real physical phenomena.

As an example, an initialization of water saturation may be performed using information as to oil-water contact. For example, for a cell that is below oil-water contact, a water saturation value for that cell may be set to unity (i.e., as water is the more dense phase, it is below the oil-water contact); and for a cell that is above oil-water contact, a water saturation value for that cell may be set to null (i.e., as oil is the lighter phase, it exists above water and hence is assumed to be free of water). Thus, in such an example, where at least some information as to spatially distributed depths of oil-water contact may be known, an initialized grid cell model may include cells with values of unity and cells with values of zero for water saturation.

As mentioned, an initialized grid cell model may not be in an equilibrium state. Thus, a module may be executed using a computing device, a computing system, etc. that acts to adjust an initialized grid cell model to approximate an equilibrium state. Given a certain saturation field for a grid cell model, a technique may adjust relative permeability end points (e.g., critical saturations) such that relevant fluids are just barely immobile at their calculated or otherwise defined initial saturations. As a result, the grid cell model, as initialized, may represent a quiescent state in the sense that no flow will occur if a simulation is started without application of some type of "force" (e.g., injection, production, etc.).

As mentioned, a reservoir simulator may advance in time. As an example, a numeric solver may be implemented that can generate a solution for individual time increments (e.g., points in time). As an example, a solver may implement an implicit solution scheme and/or an explicit solution scheme, noting that an implicit solution scheme may allow for larger time increments than an explicit scheme. Times at which a solution is desired may be set forth in a "schedule". For example, a schedule may include smaller time increments for an earlier period of time followed by larger time increments.

A solver may implement one or more techniques to help assure stability, convergence, accuracy, etc. For example, when advancing a solution in time, a solver may implement sub-increments of time, however, an increase in the number of increments can increase computation time. As an example, an adjustable increment size may be used, for example, based on information of one or more previous increments.

As an example, a numeric solver may implement one or more of a finite difference approach, a finite element approach, a finite volume approach, etc. As an example, the ECLIPSE® reservoir simulator can implement central differences for spatial approximation and forward differences in time. As an example, a matrix that represents grid cells and associated equations may be sparse, diagonally banded and blocked as well as include off-diagonal entries.

As an example, a solver may implement an implicit pressure, explicit saturation (IMPES) scheme. Such a scheme may be considered to be an intermediate form of explicit and implicit techniques. In an IMPES scheme, saturations are updated explicitly while pressure is solved implicitly.

As to conservation of mass, saturation values (e.g., for water, gas and oil) in individual cells of a grid cell model may be specified to sum to unity, which may be considered a control criterion for mass conservation. In such an example, where the sum of saturations is not sufficiently close to unity, a process may be iterated until convergence is deemed satisfactory (e.g., according to one or more convergence criteria). As governing equations tend to be non-linear (e.g., compositional, black oil, etc.), a Newton-Raphson type of technique may be implemented, which includes determining derivatives, iterations, etc. For example, a solution may be found by iterating according to the Newton-Raphson scheme where such iterations may be referred to as non-linear iterations, Newton iterations or outer iterations. Where one or more error criteria are fulfilled, the solution procedure has converged, and a converged solution has been found. Thus, within a Newton iteration, a linear problem is solved by performing a number of linear iterations, which may be referred to as inner iterations.

As an example, a solution scheme may be represented by the following pseudo-algorithm:

```
// Pseudo-algorithm for Newton-Raphson for systems
initialize(v);
do {
    //Non-linear iterations
    formulate_non_linear_system(v);
    make_total_differential(v);
    do {
        // Linear iterations:
        update_linear_system_variables(v);
    }
    while((linear_system_has_not_converged(v));
    update_non_linear_system_after_linear_convergence(v);
}
while((non_linear_system_has_not_converged(v))
```

As an example, a solver may perform a number of inner iterations (e.g., linear) and a number of outer iterations (e.g., non-linear). As an example, a number of inner iterations may be of the order of about 10 to about 20 within an outer iteration while a number of outer iterations may be about ten or less for an individual time increment.

As an example, a method can include adjusting values before performing an iteration, which may be associated with a time increment. As an example, a method can include a reception block for receiving values, an adjustment block for optimizing a quadratic function subject to linear constraints for adjusting at least a portion of the values to provide adjusted values and a simulation block to perform a simulation using at least the portion of the adjusted values.

As mentioned, fluid saturation values can indicate how fluids may be distributed spatially in a grid model of a reservoir. For example, a simulation may be run that computes values for fluid saturation parameters (e.g., at least some of which are "unknown" parameters) as well as values for one or more other parameters (e.g., pressure, etc.).

As mentioned, as an example, a method can include adjusting one or more saturation end-point values of relative permeabilities, for example, via adjusting values subject to constraints. As an example, method can include setting saturation scaling end-point values for individual cells of a grid cell model of a reservoir and, for example, running a simulation using the values where the simulation can compute saturation values for at least a portion of the cells of the grid cell model (e.g., subject to their respective end-point values).

Figure 7:
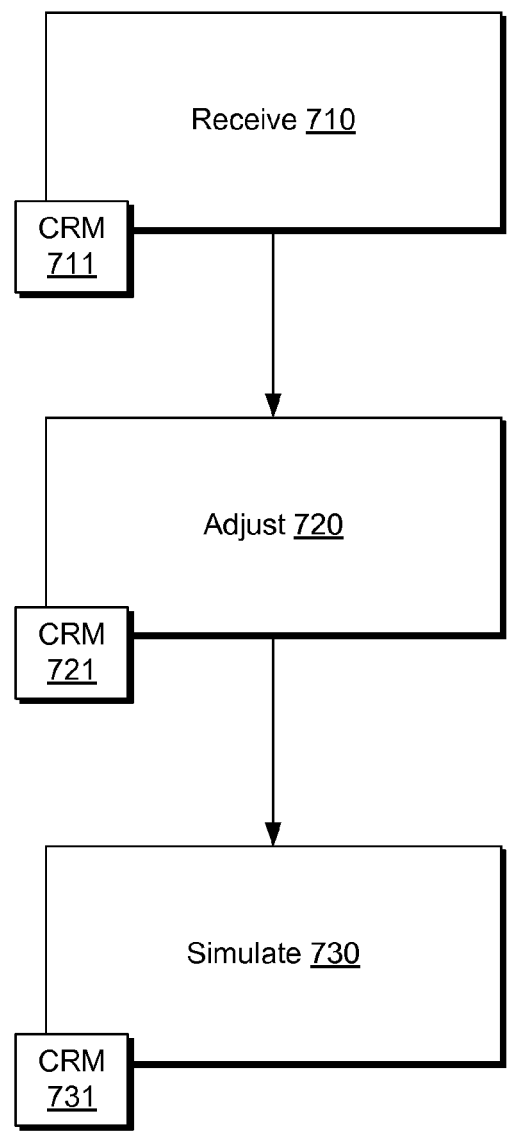
FIG. 7 illustrates an example of a method.

FIG. 7 shows an example of a method 700 that includes a reception block 710 for receiving fluid saturation data for fluid saturation parameters associated with permeabilities of a multidimensional spatial model of a geologic environment; an adjustment block 720 for adjusting at least a portion of the fluid saturation data to provide adjusted fluid saturation data by optimizing a quadratic function subject to linear constraints; and a simulation block 730 for simulating flow of fluid using the adjusted fluid saturation data for fluid saturation parameters associated with permeabilities and the multidimensional spatial model of the geologic environment.

In such an example, the data can include values that can be end-point values associated with saturations of fluids in a geologic environment. As an example, such values may be approximate values. For example, consider a value that may be unity and a value that may be zero where information pertaining to contact between two immiscible fluids may be used to determine where a value is to be unity and where a value is to be zero (e.g., null). As to linear constraints, these may include equations that pertain to mass conservation (e.g., mass balance equations). As an example, constraints can arise to ensure that at least one of a plurality of phases is mobile. For example, if a mobile phase does not exist (e.g., apart from being unrepresentative of a physical scenario), such a condition may impact converges of a simulation performed by a simulator.

The method 700 is shown in FIG. 7 in association with various computer-readable media (CRM) blocks 711, 721 and 731. Such blocks generally include instructions suitable for execution by one or more processors (or processor cores) to instruct a computing device or system to perform one or more actions. While various blocks are shown, a single medium may be configured with instructions to allow for, at least in part, performance of various actions of the method 800. As an example, a computer-readable medium (CRM) may be a computer-readable storage medium that is non-transitory and that is not a carrier wave. As an example, one or more of the block 711, 721 and 731 may be in the form of a module such as, for example, one of the modules 270 of the system 250 of FIG. 2.

As an example, a method can include, for given a set of end-point values, checking a set of inequalities, for example, to determine if the set of inequalities is satisfied. In such an example, a "checking" process (e.g., an identification process) may be performed, optionally as part of an adjustment process that adjusts one or more of the end-point values to satisfy the set of inequalities. As an example, sets of end-points that fail an inequality check may be identified (e.g., gathered) to be adjusted.

During an adjustment process, an option may be provided such that a user can chose to adjust one or more end-point values, for example, consider adjusting a value or values of SWL to preserve in situ volumes during an adjustment process. As an example, a user may select one end-point to fix, in order to allow enough freedom in a solution to satisfy remaining constraints. As an example, an implementation may allow a user to try and fix more than one property at first and see if an adjustment is possible. In such an example, if not, the user may have to reduce the number of fixed properties.

As an example, for individual grid cells to be adjusted, a function may be minimized subject to given constraints. For example, consider the following function:

$$F=\Sigma(XO-XC)2$$

where XO is the original end-point value, and XC is the adjusted value, with the sum taken over end-points violating the prescribed constraints (e.g., in a single cell).

The foregoing function is quadratic in form. For example, an expansion of the squared term results in $XO^2 - 2*XO*XC+XC^2$. As an example, a formulation of a problem may include various terms, such as, for example, consider the following formulation:

$$\text{Minimize } f(z)=(x1-v1)^2+(x2-v2)^2+\ldots(x8-v8)^2$$

where:
x1=SWL_new and v1=SWL_old . . .
x8=SOGCR_new and v1=SOGCR_old
Subject to Constraints 1 to N The foregoing approach to minimizing a function can act to seek a set of valid end-point values that simultaneously satisfy constraints and that acts to minimize modifications introduced in the end-points. As an example, a method may include weighting end-points. For example, consider a method that includes weighting different end-points differently, for example, to prioritize modifications of one or more properties over one or more other properties.

As a cost function to minimize can be quadratic and constraints can be linear, a minimization problem may be suitable to solution via a technique such as a variation of the Simplex method. As an example, a minimization problem may be a quadratic minimization problem (e.g., a quadratic programming (QP) problem). As an example, a QP problem may be a special case of a smooth nonlinear problem. As such, it may be amenable to solution via a smooth nonlinear optimization method. For example, consider a method such as the generalized reduced gradient method (GRG) or, for example, a sequential quadratic programming (SQP) method. As an example, a QP problem may be amenable to solution using an extension of the Simplex method or, for example, an extension of the interior point (IP) or barrier method.

As an example, end-points that have been fixed (e.g., by user selection, etc.) may be taken out of a cost function and replaced by their numeric values in corresponding sets of constraints. Such an approach can reduce the size of an optimization problem to be solved.

As an example, if scaled end-point data are supplied on a per-cell basis then an adjustment via an optimization may be carried out on a per-cell basis, for cells that benefit from adjustments. As an example, a result of adjusting failing cells can be a set of valid end-points that have introduced a minimum deviation from original data.

As an example, a simulation may be run in a batch mode, for example, where information is in one or more files that may be accessed and/or received by a computing device, a computing system, etc. As an example, a file or files may be stored in one or more data storage devices (e.g., local and/or remote) and accessed as part of a simulation workflow. As an example, a simulation may be run in an interactive mode, for example, where information is rendered to a display along with one or more graphic controls (e.g., of a graphical user interface). As an example, a simulation may be run in a batch mode and, for example, where a condition occurs, a trigger may cause issuance of a notice, which may include rendering a graphical user interface to a display. In such an example, a user may review information as rendered in the graphical user interface and optionally adjust one or more data, parameters, criteria, etc., for example, to initiate another run, continue a run using the adjusted information, etc. As an example, an end-point scaling plug-in, module, etc. may be operable in a batch mode of a simulator, a framework, etc. and/or in an interactive mode of a simulator, a framework, etc.

FIG. 8 shows an example of a graphical user interface (GUI) 810. Such a GUI may be rendered to a display via a computing device or computing system, for example, via execution of instructions by one or more processors (e.g., a CPU, a GPU, etc.). As shown, the GUI 810 includes various fields, graphical controls, etc. As an example, the GUI 810 may be part of a module, a plug-in, etc. For example, consider an end-point scaling plug-in that may be "plugged into" a framework such as the PETREL® framework or a simulator such as the ECLIPSE® simulator, the INTERSECT® simulator, etc. As an example, the GUI 810 may include a menu that includes menu items that correspond to a simulator. For example, consider the ECLIPSE® 100 simulator, the ECLIPSE® 300 simulator, another ECLIPSE® simulator, an INTERSECT® simulator, etc. In such an example, data may be formatted (e.g., as a file, within a file, etc.) to conform to a selected type of simulator. As an example, information entered via such a GUI may be saved to a file in a storage device (e.g., a database, etc.). As an example, a GUI may be populated with information from a file, for example, for review. As an example, a GUI may include fields that can be filled with information as to initial values, adjusted values, differences, etc.

As an example, the GUI 810 can include check box graphical controls that allow for "fixing" one or more parameters. As an example, a GUI may include one or more fields for entry of one or more tolerance values (e.g., mobility tolerance values).

As an example, the GUI 810 can include "buttons" or other types of graphical controls that are selectable via touch input, mouse input, voice input, stylus input, etc. to cause instructions to be executed to perform an action or actions. For example, consider a "check" control that can be activated via input to cause a checking process to commence. In such an example, the checking process may identify one or more cells of a grid cell model of a geologic environment for adjustment. In such an example, an "adjust" control may be activated via input to cause an adjustment process to commence that acts to adjust one or more values of the identified cells of the grid cell model, for example, according to a function and constraints. In such an example, the function may be a quadratic function and the constraints may be linear constraints. As an example, an adjustment or adjusting process may implement a method that can provide a solution to a quadratic programming problem (e.g., a QP problem).

As an example, the GUI 810 may be associated with a module that can implement the optimization of the adjustment block 720 of the method 700 of FIG. 7. For example, the "adjust" control may be selected via receipt of input to cause an optimization process to commence that acts to solve a programming problem with associated function and constraints. In such an example, a solution may provide adjusted values for one or more cells of a grid cell model of a geologic environment.

In the example of FIG. 8, the abbreviations may correspond to so-called "keywords" as may be used by a framework. For example, the ECLIPSE® simulator includes various keywords, including, for example, SWL, SWLPC (E100), SWCR, SWU, SGL, SGLPC (E100), SGCR, SGU, SOWCR, SOGCR, SWGCR (E300 for IKU3P), SGWCR (E300 for IKU3P), KRW, KRWR, KRG, KRGR, KRO, KRORG, KRORW, PCG and PCW.

As an example, a plug-in, a module, etc. that provides executable instructions for adjusting one or more end-points (e.g., via end-point scaling, etc.) may operate in a batch mode, an interactive mode or other mode. As an example, instructions may be executable using one or more processors. As an example, instructions may be executable using virtualization (e.g., consider one or more virtual machines). As an example, instructions may be executable via a computing device or computing system that includes one or more hypervisors. As an example, a computing device or system may include a hypervisor that may operate one or more virtual machines that can be implemented in parallel to perform parallel processing. As an example, a hypervisor may be software, firmware and/or hardware that can create virtual machines. A computing device or system on which a hypervisor is running one or more virtual machines may be defined as a host machine where, for example, each virtual machine may be referred to as a guest machine.

As an example, instructions may be executable in parallel. For example, in a model that includes a plurality of cells where equations exist for individual cells, instructions that can adjust end-points values may be executed in parallel, particularly where end-point values of an individual cell are independent of end-point values of one or more other individual cells. As an example, a method can include adjusting end-point values in a plurality of cells in parallel where equations are independent (e.g., not coupled) for individual cells of the plurality of cells. In such an example, the method may optionally perform in part in parallel and in part in serial. For example, cells of a grid cell model may be grouped into groups of cells where groups may form parallel members and cells within a group may be serial members.

Figure 9:
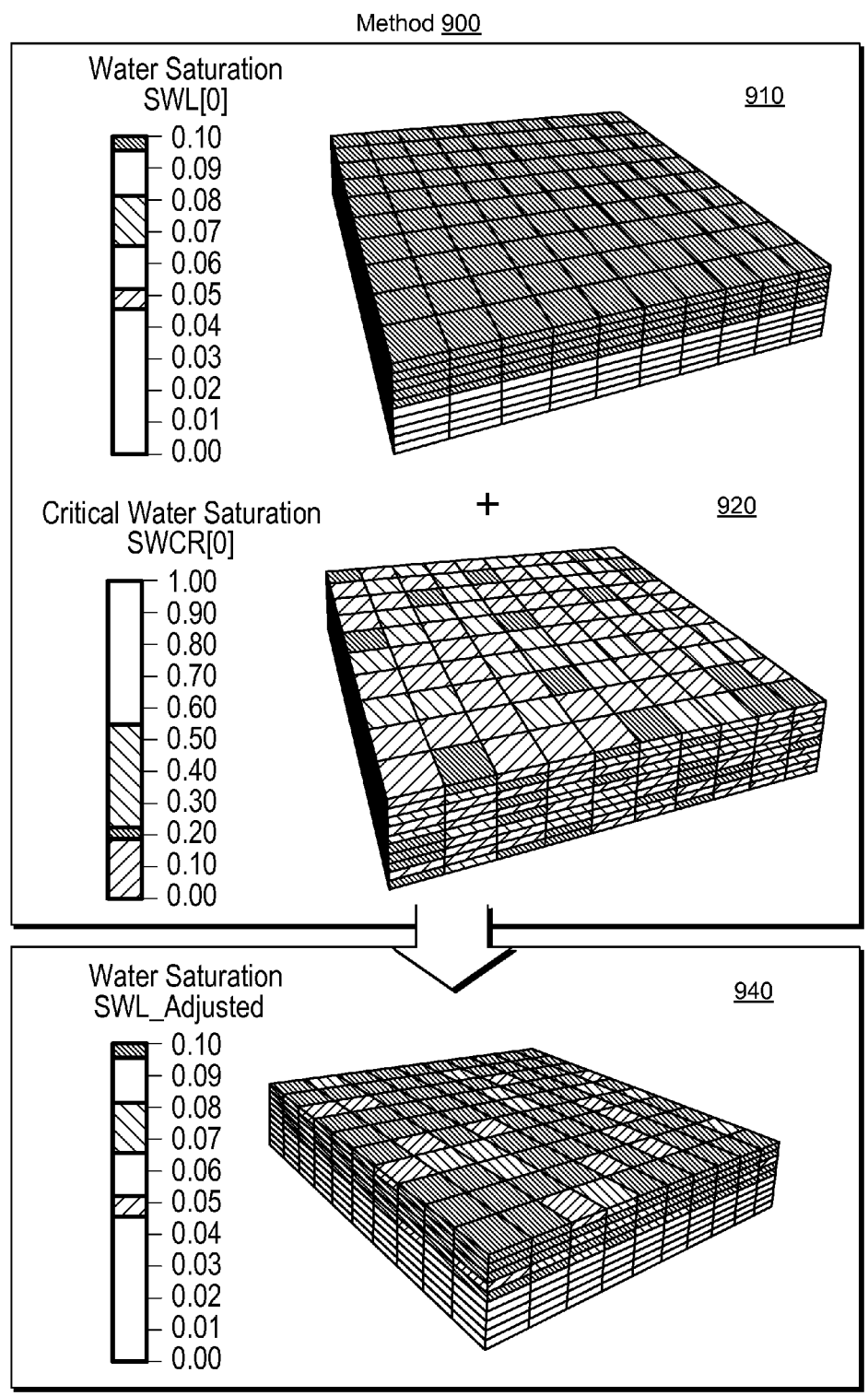
FIG. 9 illustrates an example of a method.

FIG. 9 shows an example of a method 900 that include receiving data for initial water saturation (SWL[0]) 910 and receiving data for initial critical water saturation (SWCR[0]) 920. By formulating an optimization problem and solving the problem, the method 900 can output adjusted data for water saturation (SWL_Adjusted) 930. As seen in the example of FIG. 9, where values for water saturation were uniformly set within a region to be at about 0.1, at least some of those values for particular cells in a grid cell model of a geologic environment are adjusted to be less than about 0.1.

A method may include adjusting values to, for example, improve estimations of a fluid that may be "initially in place" in a geologic environment. For example, values that have not been optimized may provide erroneous estimates of such a fluid (e.g., oil). By solving a quadratic function subject to linear constraints to adjust values of saturations (e.g., end-point values), a method can improve accuracy of estimates of oil in place in a geologic environment. As an example, where such estimates are provided via a reservoir simulator, the reservoir simulator may receive adjusted values, which may help to promote convergence, reduce computation time, reduce number of iterations as to a particular time or times, etc.

Figure 10:
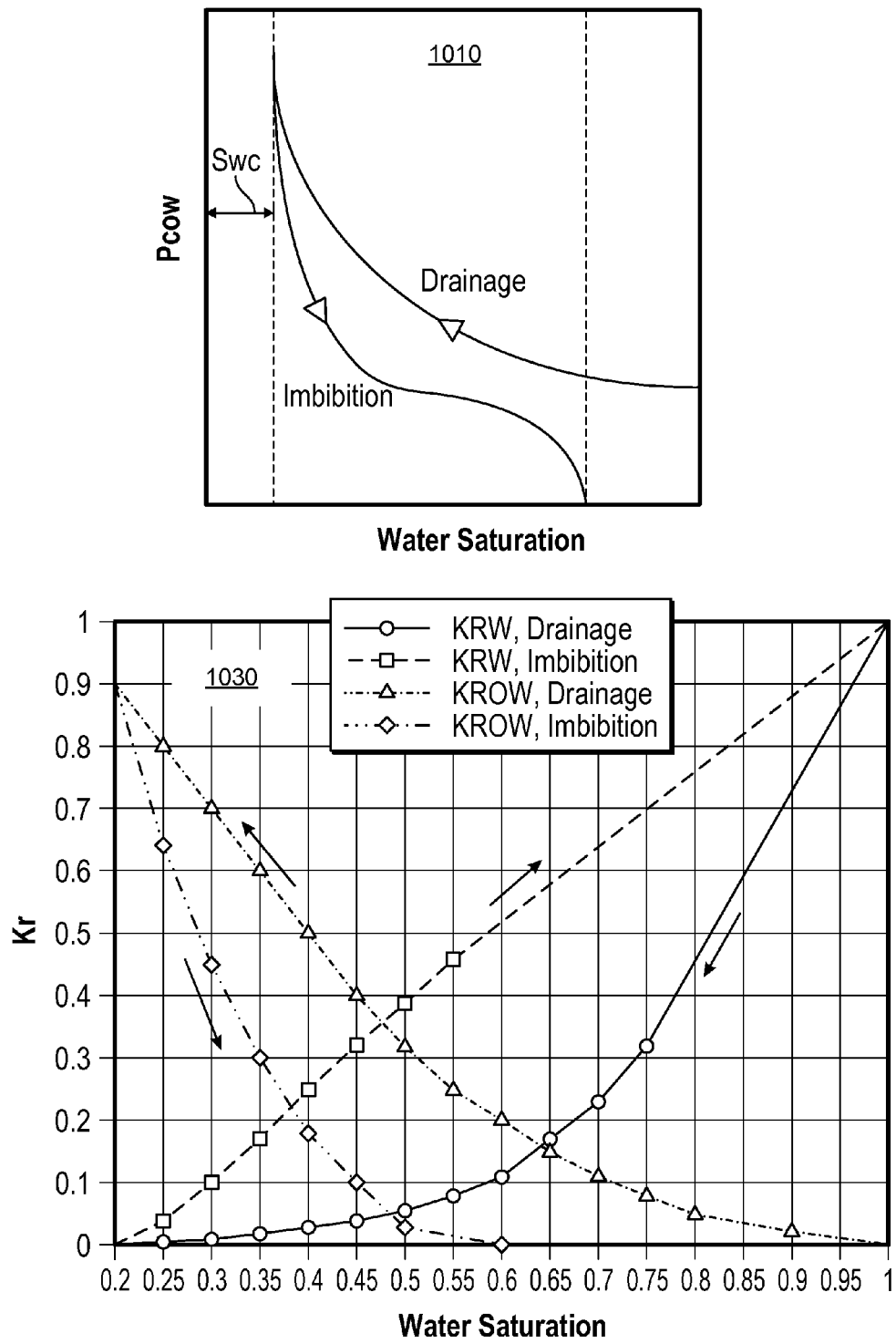
FIG. 10 illustrates example plots.

FIG. 10 shows an example plot 1010 and an example plot 1030 that illustrate hysteresis as to drainage and imbibition. As shown, permeability and saturation can follow different "paths" for drainage and imbibition. In other words, for a given saturation, permeability may depend on whether fluid is entering or exiting rock, which may be represented by a cell of a grid cell model of a geologic environment.

As an example, when hysteresis is specified in a model, drainage data and imbibition data may be provided. In such an example, one set of data may be used for cells of a grid cell model that experience drainage and another set of data may be used for cells of a grid cell model that experience imbibition. As an example, over time, a cell may change from a drainage cell to an imbibition cell or vice versa. As an example, data may be directional, for example, data may correspond to drainage as one direction and other data may correspond to imbibition as another direction. As an example, directional phenomena may be hysteresis (e.g., where phenomena differ depending on direction).

When directional relative permeabilities are used, as an example, sets may be extended to include, for example, SWLX, SWLY and SWLZ, etc. and ISWLX, ISWLY and ISWLY, etc. (e.g., where hysteresis is specified). Hence, a set for SWL can become: SWL, SWLX, SWLY, SWLZ and ISWL, ISWLX, ISWLY, ISWLZ.

As an example, when irreversible directional relative permeabiltiies are used, these may be extended further to include SWLX-, SWLY- and SWLZ- and ISWLX-, ISWLY- and ISWLZ- (e.g., if hysteresis is included). Hence, a set for SWL can becomes: SWL, SWLX, SWLY, SWLZ, SWLX-, SWLY-, SWLZ- and ISWL, ISWLX, ISWLY, ISWLZ, ISWLX-, ISWLY-, ISWLZ-.

As an example, for a particular scenario, a total of fourteen possible variants of each of the above keywords may exist (e.g., except SGLPC and SWLPC for which the directional and irreversible directional relative permeability variants may not be supported).

As an example, for a reservoir simulator, various options may exist. For example, consider an ODD3P model is an extension to an IKU3P model option in compositional ECLIPSE® simulator. As an example, imbibition versions of one or more "keywords" (e.g., SGWCR and SWGCR) may be defined and used where hysteresis is supported.

As an example, an ODD3P model option may use sets such as primary residual saturations (e.g., PSiRj) and hysteresis residual saturations (e.g., HSiRj) (e.g., where oil, water and gas may be indexed i=O, W or G and j=O, W, or G but i≠j).

As an example, depth dependent end-point tables (e.g., ENPTVD, ENPCVD and ENKRVD) may exist that may combine with grid block values. As an example, for data, "keywords" such as INPTVD, etc. for imbibition and directional variations such as ENPTVDX, ENPTVDX, etc. may exist.

A method can include receiving fluid saturation data for fluid saturation parameters associated with permeabilities of a multidimensional spatial model of a geologic environment; adjusting at least a portion of the fluid saturation data to provide adjusted fluid saturation data by optimizing a quadratic function subject to linear constraints; and simulating flow of fluid using the adjusted fluid saturation data for fluid saturation parameters associated with permeabilities and the multidimensional spatial model of the geologic environment. In such an example, the fluid saturation data can include end-point values where, for example, the adjusted fluid saturation data include adjusted end-point values.

As an example, a method can include receiving fluid saturation data that include directional fluid saturation data that include, for example, drainage data and imbibition data.

As an example, a method can include simulating flow of fluid by running a reservoir simulator.

As an example, adjusted fluid saturation data can include data for an approximated equilibrium state. As an example, a method can include adjusting values by solving a quadratic programming problem where a quadratic function includes a quadratic cost function subject to linear constraints. As an example, linear constraints may be or include mass balance constraints.

As an example, a method can include simulating via inner iterations and outer iterations associated with linear and non-linear formulations of equations, respectively. As an example, a multidimensional spatial model may be or include a grid cell model that includes grid cells. As an example, a method may include identifying grid cells of a grid cell model that violate at least one criterion. In such an example, a method can include adjusting fluid saturation data for at least a portion of the identified grid cells.

As an example, a method can include weighting at least one of fluid saturation parameter of a plurality of fluid saturation parameters.

As an example, a method can include simulating fluid according to a schedule. For example, consider a schedule that may include times of days, months, years, etc.

A system can include a processor; memory operatively coupled to the processor; and at least one module that includes processor-executable instructions stored in the memory to instruct the system where the instructions include instructions to receive fluid saturation data for fluid saturation parameters associated with permeabilities of a multidimensional spatial model of a geologic environment; adjust at least a portion of the fluid saturation data to provide adjusted fluid saturation data via optimization of a quadratic function subject to linear constraints; and simulate flow of fluid using the adjusted fluid saturation data for fluid saturation parameters associated with permeabilities and the multidimensional spatial model of the geologic environment. In such an example, the fluid saturation data can include end-point values and the adjusted fluid saturation data can include adjusted end-point values. As an example, a system can include instructions that solve a quadratic programming problem where a quadratic function includes a quadratic cost function subject to linear constraints.

One or more computer-readable storage media can include computer-executable instructions to instruct a computer where the instructions include instructions to: receive fluid saturation data for fluid saturation parameters associated with permeabiltiies of a multidimensional spatial model of a geologic environment; adjust at least a portion of the fluid saturation data to provide adjusted fluid saturation data via optimization of a quadratic function subject to linear constraints; and simulate flow of fluid using the adjusted fluid saturation data for fluid saturation parameters associated with permeabilities and the multidimensional spatial model of the geologic environment. In such an example, the fluid saturation data can include end-point values and the adjusted fluid saturation data can include adjusted end-point values. As an example, one or more computer-readable storage media can include instructions that solve a quadratic programming problem where a quadratic function includes a quadratic cost function subject to linear constraints.

Figure 11:
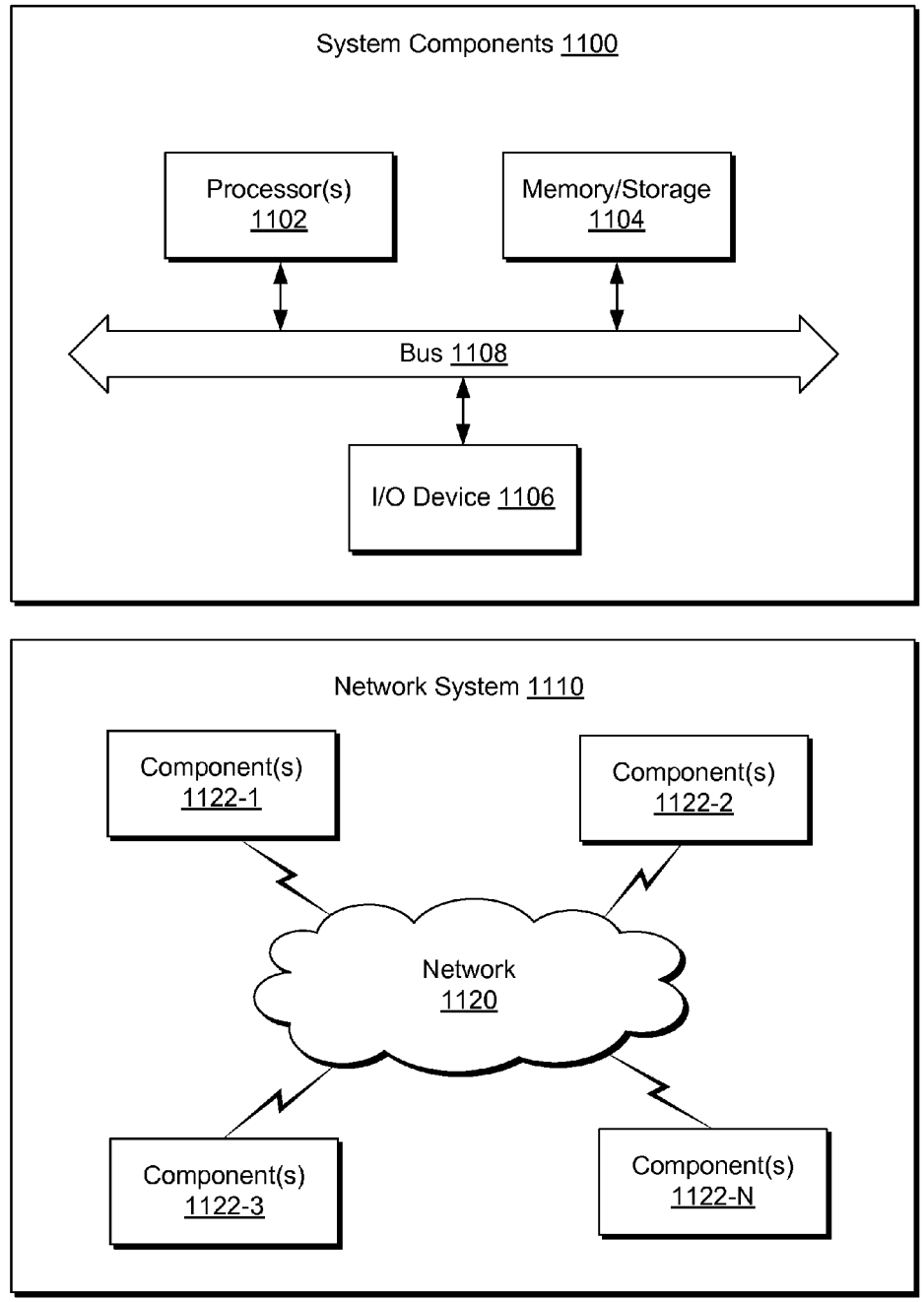
FIG. 11 illustrates example components of a system and a networked system.

FIG. 11 shows components of an example of a computing system 1100 and an example of a networked system 1110. The system 1100 includes one or more processors 1102, memory and/or storage components 1104, one or more input and/or output devices 1106 and a bus 1108. In an example embodiment, instructions may be stored in one or more computer-readable media (e.g., memory/storage components 1104). Such instructions may be read by one or more processors (e.g., the processor(s) 1102) via a communication bus (e.g., the bus 1108), which may be wired or wireless. The one or more processors may execute such instructions to implement (wholly or in part) one or more attributes (e.g., as part of a method). A user may view output from and interact with a process via an I/O device (e.g., the device 1106). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1110. The network system 1110 includes components 1122-1, 1122-2, 1122-3, . . . 1122-N. For example, the components 1122-1 may include the processor(s) 1102 while the component(s) 1122-3 may include memory accessible by the processor(s) 1102. Further, the component(s) 1102-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A computing system implemented method comprising:
   receiving, in a computing system, fluid saturation data for fluid saturation parameters associated with permeabilities of a multidimensional spatial model of a geologic environment wherein the multidimensional spatial model comprises a grid cell model that comprises a plurality of grid cells;
   identifying, using the computing system, grid cells of the grid cell model that violate at least one criterion that depends on at least two different fluid saturation parameters;
   adjusting, using the computing system, at least a portion of the fluid saturation data for at least a portion of the identified grid cells to provide adjusted fluid saturation data by optimizing a quadratic function of different fluid saturation parameters subject to linear constraints wherein at least one of the linear constraints depends on at least two different fluid saturation parameters; and
   simulating, using the computing system, flow of fluid using the adjusted fluid saturation data for fluid saturation parameters associated with permeabilities and the multidimensional spatial model of the geologic environment.

2. The method of claim 1 wherein the fluid saturation data comprise end-point values.

3. The method of claim 2 wherein the adjusted fluid saturation data comprise adjusted end-point values.

4. The method of claim 1 wherein the fluid saturation data comprise directional fluid saturation data that comprise drainage data and imbibition data.

5. The method of claim 1 wherein the simulating flow of fluid comprises running a reservoir simulator.

6. The method of claim 1 wherein the adjusted fluid saturation data comprise data for an approximated equilibrium state.

7. The method of claim 1 wherein the adjusting comprises solving a quadratic programming problem wherein the quadratic function comprises a quadratic cost function subject to the linear constraints.

8. The method of claim 1 wherein the linear constraints comprise mass balance constraints.

9. The method of claim 1 wherein the simulating comprises inner iterations and outer iterations associated with linear and non-linear formulations of equations, respectively.

10. The method of claim 1 further comprising weighting at least one of the fluid saturation parameters.

11. The method of claim 1 wherein the simulating comprises simulating fluid according to a schedule.

12. The method of claim 1 comprising generating the multidimensional spatial model of the geologic environment based at least in part on data acquired by at least one sensor.

13. The method of claim 1 comprising generating the multidimensional spatial model of the geologic environment based at least in part on seismic data acquired by at least one sensor.

14. The method of claim 1 comprising, based at least in part on the simulating, assessing the geologic environment to generate a well plan.

15. A system comprising:
   a processor;
   memory operatively coupled to the processor; and
   processor-executable instructions stored in the memory to instruct the system to:
      receive fluid saturation data for fluid saturation parameters associated with permeabilities of a multidimensional spatial model of a geologic environment wherein the multidimensional spatial model comprises a grid cell model that comprises a plurality of grid cells;
      identify grid cells of the grid cell model that violate at least one criterion that depends on at least two different fluid saturation parameters;
      adjust at least a portion of the fluid saturation data for at least a portion of the identified grid cells to provide adjusted fluid saturation data via optimization of a quadratic function of different fluid saturation parameters subject to linear constraints wherein at least one of the linear constraints depends on at least two different fluid saturation parameters; and
      simulate flow of fluid using the adjusted fluid saturation data for fluid saturation parameters associated with permeabilities and the multidimensional spatial model of the geologic environment.

16. The system of claim 15 wherein the fluid saturation data comprise end-point values and wherein the adjusted fluid saturation data comprise adjusted end-point values.

17. The system of claim 15 wherein the instructions to adjust comprise instructions that solve a quadratic programming problem wherein the quadratic function comprises a quadratic cost function subject to the linear constraints.

18. One or more non-transitory computer-readable storage media comprising computer-executable instructions to instruct a computer, the instructions comprising instructions to:
   receive fluid saturation data for fluid saturation parameters associated with permeabilities of a multidimensional spatial model of a geologic environment wherein the multidimensional spatial model comprises a grid cell model that comprises a plurality of grid cells;
   identify grid cells of the grid cell model that violate at least one criterion that depends on at least two different fluid saturation parameters;
   adjust at least a portion of the fluid saturation data for at least a portion of the identified grid cells to provide adjusted fluid saturation data via optimization of a quadratic function of different fluid saturation parameters subject to linear constraints wherein at least one of the linear constraints depends on at least two different fluid saturation parameters; and
   simulate flow of fluid using the adjusted fluid saturation data for fluid saturation parameters associated with permeabilities and the multidimensional spatial model of the geologic environment.

19. The one or more non-transitory computer-readable storage media of claim 18 wherein the fluid saturation data comprise end-point values and wherein the adjusted fluid saturation data comprise adjusted end-point values.

20. The one or more non-transitory computer-readable storage media of claim 18 wherein the instructions to adjust comprise instructions that solve a quadratic programming problem wherein the quadratic function comprises a quadratic cost function subject to the linear constraints.

* * * * *